(12) United States Patent
Hubers Van Assenraad

(10) Patent No.: US 12,052,334 B2
(45) Date of Patent: Jul. 30, 2024

(54) METHOD FOR DATA COMMUNICATION USING A SEQUENCE WITH AN ORDERED PLURALITY OF BLOCKS ASSOCIATED WITH A SEGMENT

(71) Applicant: DULL IP PTY LTD, Melbourne (AU)

(72) Inventor: Todd Steven Hubers Van Assenraad, East Geelong (AU)

(73) Assignee: DULL IP PTY LTD, Melbourne (AU)

( * ) Notice: Subject to any disclaimer, the term of this patent is extended or adjusted under 35 U.S.C. 154(b) by 0 days.

(21) Appl. No.: 17/773,262

(22) PCT Filed: Mar. 13, 2020

(86) PCT No.: PCT/AU2020/050244
§ 371 (c)(1),
(2) Date: Apr. 29, 2022

(87) PCT Pub. No.: WO2021/081575
PCT Pub. Date: May 6, 2021

(65) Prior Publication Data
US 2024/0155047 A1 May 9, 2024

(30) Foreign Application Priority Data
Oct. 30, 2019 (AU) .............................. 2019904082

(51) Int. Cl.
*H04L 69/324* (2022.01)
(52) U.S. Cl.
CPC .................. *H04L 69/324* (2013.01)
(58) Field of Classification Search
CPC .................................................... H04L 69/324
See application file for complete search history.

(56) References Cited

U.S. PATENT DOCUMENTS

| | | | |
|---|---|---|---|
| 8,370,458 B2 * | 2/2013 | Cheriton | G06F 15/16 |
| | | | 709/219 |
| 9,413,797 B2 * | 8/2016 | Kärkkäinen | H04N 21/643 |
| 9,729,562 B2 | 8/2017 | Sonnenberg et al. | |

(Continued)

FOREIGN PATENT DOCUMENTS

| | | |
|---|---|---|
| CN | 105939331 A | 9/2016 |
| CN | 109508202 A | 3/2019 |
| EP | 2 421 201 A1 | 2/2012 |

OTHER PUBLICATIONS

Australian Patent Office International-Type Search Report, dated Jan. 14, 2020, pp. 1-22, issued in National Application No. 2019904082, Australian Patent Office, Woden ACT, Australia.

(Continued)

*Primary Examiner* — Chandrahas B Patel
(74) *Attorney, Agent, or Firm* — Crowell & Moring LLP; John C. Freeman

(57) ABSTRACT

A method for data communication via a network that includes configuring, on a first computer, a first sequence including an ordered plurality of first blocks associated with at least one segment; and initializing the first blocks and undertaking data communication between the first computer and a second computer first block represents a configurable data communication function. Blocks may be assigned to a plural of segments and subsequently interconnected. Communication may be between other computers and/or applications.

19 Claims, 15 Drawing Sheets

(56) References Cited

U.S. PATENT DOCUMENTS

| | | | |
|---|---|---|---|
| 2004/0095937 | A1 | 5/2004 | Piche et al. |
| 2004/0128540 | A1 | 7/2004 | Roskind |
| 2011/0013776 | A1 | 1/2011 | McAlister |
| 2013/0332724 | A1 | 12/2013 | Walters |
| 2014/0153572 | A1 | 6/2014 | Hampel et al. |
| 2016/0248858 | A1 | 8/2016 | Qui et al. |
| 2016/0261615 | A1 | 9/2016 | Sonnenberg et al. |
| 2018/0007108 | A1* | 1/2018 | Kärkkäinen ........ H04L 49/9057 |
| 2019/0207784 | A1 | 7/2019 | Aizikovich |

OTHER PUBLICATIONS

International Search Report dated Apr. 28, 2020 (4 pages) from PCT Priority Application PCT/AU2020/050244.

Written Opinion of the International Searching Authority dated Apr. 28, 2020 (4 pages) from PCT Priority Application PCT/AU2020/050244.

International Report on Patentability dated May 3, 2022 (7 pages) from PCT Priority Application PCT/AU2020/050244.

Gerhard Rieger, socat—Handling all Kinds of Sockets, dated Jun. 6, 2007, 55 pgs., available at URL http://www.dest-unreach.org/socat/doc/linuxwochen2007-socat.pdf.

Gerhard Rieger, Executing programs using socat, retrieved from internet on May 5, 2020, 2 pgs., available at URL https://web.archive.org/web/20180824003739/http://www.dest-unreach.org/socat/doc/socat-exec.html.

Configuration—Consul by HashiCorp, 2019, retrieved from internet on May 5, 2020, 46 pgs., available at URL https://web.archive.org/web/20190929120558/https://www.consul.io/docs/agent/options.html.

Extended European Search Report (EESR) (9 pages) issued in respect of corresponding European Patent Application No. 20881980.5 dated Oct. 6, 2023.

Article, Thomas Plagemann, "A Framework for Dynamic Protocol Configuration" European Transactions on Telecommunications, vol. 10, No. 3, May 1, 1999, pp. 263-273, 11 pages; pp. 263-273, XP000860638; ISSN: 1124-318X.

Article, Yu et al., "Establishing TCP Connections Between Hosts Behind NATs" IET International Conference on Wireless, Mobile and Multimedia Networks 2006, 3 pages, Nov. 6-9, 2006, Hangzhou, China, Jan. 1, 2006 (Jan. 1, 2006), p. 103, 3 pages, XP093079276, Stevenage, UK, DOI: 10.1049/cp:20061268, ISBN: 978-0-86341-644-6, Retrieved from the Internet: URL:https://ieeexplore.ieee.org/stampPDF/getPDF.jsp?tp=&arnumber=5195429&ref=aHR0cHM6Ly9pZWVIeHBsb3JlLmllZWUub3JnL2RvY3VtZW50LzUxOTU0Mjk=>.

First Office Action dated Dec. 15, 2023 (20 pages) out of related Chinese application No. 202080078189.X.

Qian et al.—Application of Embedded Ethernet Communication Interface in Receiver—[J]. China Computer & Network, Mar. 11, 2011 (7); pp. 49-52.

* cited by examiner

METHOD FOR DATA COMMUNICATION USING A SEQUENCE WITH AN ORDERED PLURALITY OF BLOCKS ASSOCIATED WITH A SEGMENT

This application is a national application based on Patent Cooperation Treaty Patent Application No. PCT/AU2020/050244, filed on Mar. 13, 2020, the entire contents of which are incorporated herein by reference.

This application claims under 35 U.S.C. § 119(a) the benefit of the filing date of Australian Patent Application No. 2019904082, filed on Oct. 30, 2019, the entire contents of which are incorporated herein by reference.

FIELD OF THE INVENTION

The invention generally relates to methods and systems for data communication via a network, for example, configurable network communication.

DESCRIPTION OF RELATED ART

Network tunnelling is known, where two private networks can be virtually connected via a public network. However, such tunnelling methods typically lack flexibility and versatility. This limits latency, throughput, reliability, reach, and potential new capabilities. Also, present tunnelling technologies typically require a centralised controller to restrict packets with a firewall allowing only authorised communication. This can result in limitations regarding performance (e.g. latency) and may result in a central point of failure.

SUMMARY OF THE INVENTION

According to an aspect of the present disclosure, there is provided a method for data communication via a network, the method including the steps of: configuring, on a first computer, a first sequence including an ordered plurality of first blocks associated with at least one segment; and initializing the first blocks and undertaking data communication between the first computer and a second computer, wherein each first block represents a configurable data communication function.

In an embodiment, the method further includes: assigning one or more first blocks to a first segment and one or more other first blocks to a second segment; initializing the first blocks of the first segment and initializing the first blocks of the second segment; and subsequently causing a data communication between a first block of the first segment and a first block of the second segment. At least one segment may be associated with data communication with an application running on the first computer. At least one segment may be associated with data communication with the second computer or another computer over a data network.

In an embodiment, the method further includes: configuring, on the second computer, a second sequence including an ordered plurality of second blocks associated with at least one segment, wherein each of one or more of the second blocks is uniquely associated with a first block; and initializing the second blocks and undertaking data communication between the first computer and the second computer, wherein each second block represents a configurable data communication function.

Optionally, at least one first block is an originating first block configured to interact with an application running on the first computer and/or at least one second block is an originating second block configured to interact with an application running on the second computer.

Optionally, initializing the first blocks of a segment and/or second blocks of a segment includes traversing each separately in a first direction followed by traversing in an opposite second direction, wherein traversing includes activating the communication functions associated with the first blocks and the second blocks according to activation rules. Each first block and each second block may be configurable as a top-down block type or a bottom-up block type, and an activation rule may be such that only the communication functions associated with the first blocks and the second blocks of the top-down block type are activated when traversed in the first direction and such that only the communication functions associated with the first blocks and the second blocks of the bottom-up type are activated when traversed in the second direction.

Optionally, initializing the first blocks and second blocks includes traversing each separately in a respective first direction only, wherein traversing includes activating the communication functions associated with the first blocks and the second blocks according to activation rules.

Optionally, at least one first block and/or at least one second block is configured as an encapsulating block type, such that the communication functions associated with the defined first blocks and second blocks undertake the data communication after initialization. At least one first block and at least one second block may be configured as a network protocol for communication with an IP network, for example a public network such as the Internet.

Optionally, at least one first block and/or at least one second block is configured as a non-encapsulating block type, such that the communication functions associated with the defined first blocks and second blocks do not take part in the data communication after initialization.

In an embodiment, the method further includes one or more first blocks and one or more second blocks associated with communication functions configured to communicate with at least one relay server. The first blocks of the first sequence and the second blocks of the second sequence may communicate with the network via the first blocks and second blocks configured to communicate with the at least one relay server.

In an embodiment, the method further includes one or more first blocks and one or more second blocks associated with communication functions configured to communicate with a connection server. At least one first block and at least one second block may be associated with communication functions configured to communicate with the connection server is only used for initializing the data communication.

Optionally, initialization of the first sequence is in response to receipt of an activation command and/or initialization of the second sequence is in response to receipt of an activation command.

Optionally, the data communication is between a first application running on the first computer and a second application running on the second computer.

According to another aspect of the present disclosure, there is provided a method for creating data communications between a plurality of applications, including the step of implementing the method of the previous aspect for each of one or more applications running on a first computer and one or more applications running on a second computer.

According to another aspect of the present disclosure, there is provided a system including a first computer, wherein the first computer is configured to: generate a first sequence including an ordered plurality of first blocks associated with at least one segment; initialize the first blocks according to the first sequence; and undertake data communicate with a second computer according to the initializing the first blocks, wherein each block represents a configurable data communication function.

In an embodiment, the first computer further configured to: assign one or more first blocks to a first segment and one or more other first blocks to a second segment; initialize the first blocks of the first segment and initialize the first blocks of the second segment; and subsequently cause a data communication between a first block of the first segment and a first block of the second segment. At least one segment may be associated with data communication with an application running on the first computer. At least one segment may be associated with data communication with the second computer or another computer over a data network.

In an embodiment, the system further includes the second computer which is configured to: generate a second sequence including an ordered plurality of second blocks associated with at least one segment; initialize the second blocks according to the second sequence; and undertake data communicate with the first computer according to the initialized the second blocks, wherein each of at least one second block is uniquely associated with a first block.

Optionally, at least one first block is an originating first block configured to interact with an application running on the first computer and/or at least one second block is an originating second block configured to interact with an application running on the second computer.

Optionally, the first computer is configured, when initializing the first blocks, to traverse the first blocks of a segment in a first direction followed by traversing in an opposite second direction; and the second computer is configured, when initializing the second blocks, to traverse the second blocks of a segment in a first direction followed by traversing in an opposite second direction, wherein traversing includes activating the communication functions associated with the first blocks and the second blocks according to activation rules. Each first block and each second block may be configurable as a top-down block type or a bottom-up block type, and an activation rule may be such that only the communication functions associated with the first blocks and the second blocks of the top-down block type are activated when traversed in the first direction and such that only the communication functions associated with the first blocks and the second blocks of the bottom-up type are activated when traversed in the second direction.

Optionally, the first computer is configured, when initializing the first blocks, to traverse the first blocks of a segment in a first direction only; and the second computer is configured, when initializing the second blocks, to traverse the second blocks of a segment in a first direction only, wherein traversing includes activating the communication functions associated with the first blocks and the second blocks according to activation rules.

Optionally, at least one first block and/or at least one second block is configured as an encapsulating block type, such that that the communication functions associated with the defined first blocks and second blocks cause their respective computers to undertake the data communication after initialisation. At least one first block and at least one second block may be configured as a network protocol for communication with an IP network, for example a public network such as the Internet.

Optionally, at least one first block and/or at least one second block is configured as a non-encapsulating block type, such that the communication functions associated with the defined first blocks and second blocks do not take part in the data communication after initialization.

In an embodiment, the system further includes one or more first blocks and one or more second blocks associated with communication functions configured to communicate with at least one relay server. The first blocks of the first sequence and the second blocks of the second sequence may communicate with the network via the first blocks and second blocks configured to communicate with the at least one relay server. The system may include the at least one relay server.

In an embodiment, the system further includes one or more first blocks and one or more second blocks associated with communication functions configured to communicate with a connection server. At least one first block and at least one second block may be associated with communication functions configured to communicate with the connection server is only used for initializing the data communication. The system may include the connection server.

Optionally, initialisation of the first sequence is in response to receipt of an activation command and/or initialization of the second sequence is in response to receipt of an activation command.

Optionally, the data communication is between a first application running on the first computer and a second application running on the second computer.

According to another aspect of present disclosure, there is provided a computer including a computer program configured to cause the computer to implement the method of the first aspect.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which.

DESCRIPTION OF EMBODIMENTS

Figure 1:
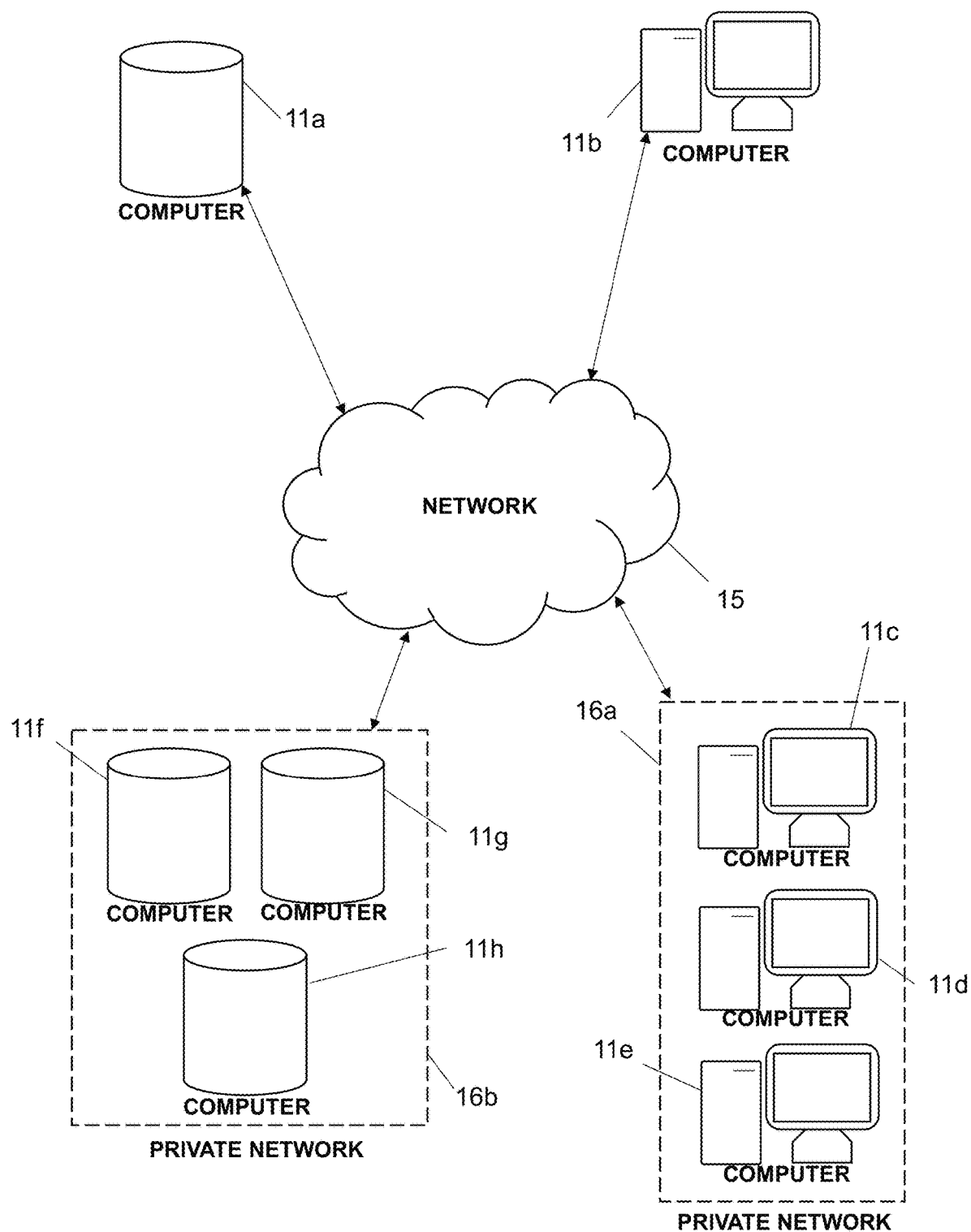
FIG. 1 shows a communication system according to an embodiment in accordance with the present invention.

FIG. 1 shows a communication system 10, representative of embodiments described herein. The system 10 includes several computers 11 in data communication with a network 15. In this way, two (or more) computers 11 can undertake data communication with one another via the network 15. The network 15 should be understood to represent any interconnection of two or more computing devices-typically at least a portion of the network 15 will include a public network such as the Internet. The data communication may be based, at least in part, on the Internet Protocol (IP). However, other forms of data communication may be included, for example, portions of the data communication may include protocols such as Bluetooth or USB. Computers 11a and 11b are shown in a direct data communication with the network 15, whereas computers 11c-11e communicate with the network 15 via private network 16a and computers 11f-11h communicate with the network 15 via private network 16b.

For the purposes of this disclosure, a general feature shown in the figures is represented by a numerical reference—for example, the computers 11 and the network 15. Such references, where appropriate, are shared amongst the figures. Where reference to specific instances of the features is desirable, a lowercase letter suffix is appended to the numerical reference—for example, in FIG. 1, computer 11a can be distinguished from computer 11b.

For the purposes of this disclosure, the computers 11 should be considered to correspond to any suitable computing device having facility for data communication over the network 15—many implementations of such computers 11 exist, for example stand-alone computing hardware (e.g. desktop or laptop computers), standalone servers, distributed computing arrangements, mobile devices such as smartphones and tablets, and many others. In FIG. 1, for illustration, computers 11a and 11f-11h are represented as servers whereas computers 11b-11e are represented as desktop computers. A computer 11 may correspond to a virtual computer implemented within a server environment, for example. Therefore, two computers 11 may correspond to virtual computers implemented within the same server infrastructure.

Figure 2:
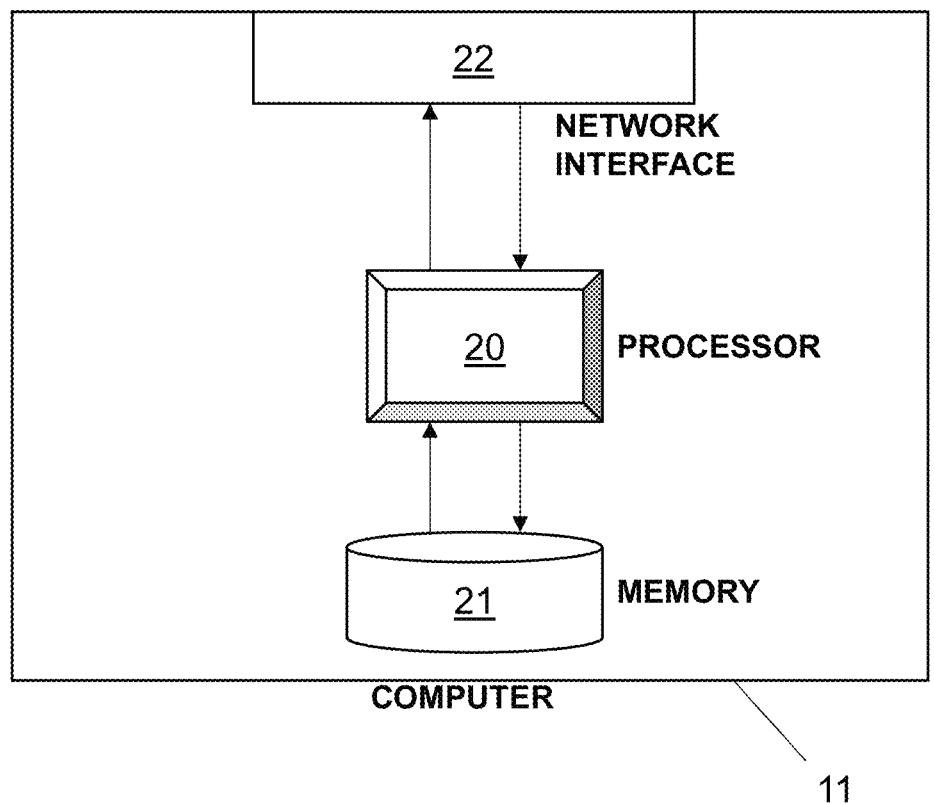
FIG. 2 shows a schematic of a typical computer.

Referring to FIG. 2, in a general sense, a computer 11 will include a processor 20 interfaced with a memory 21 and a network interface 22. The processor 20 as shown can correspond, in practice, to a single CPU, a plurality of CPUs, a functionally interconnected network of a plurality of CPUs implemented in separated hardware, a microcontroller, etc. The memory 21 will typically include a volatile memory and a non-volatile memory. The memory 21 is configured to store program instructions executable by the processor 20, and for providing a data space for storing data used by the program instructions.

The network interface 22 is configured to enable the processor 20 to communicate data over the network 15 and to receive data via the network 15. The network 15 shown in FIG. 1 should be interpreted as any interconnection of a plurality of devices-including computing devices as well as network nodes such as routers and switches. The connections may utilize wired electrical, optical, and wireless connections (typically a combination of many of these). Relevantly, the data communication is typically defined by one or more protocols—for example, the TCP/IP stack common for communications over the Internet. The network 15 may include a public network, such as the Internet.

According to embodiments described herein, it is desired to enable data communication between two computers 11, which may not part of the same private network 16, such that the effect is as if the two computers 11a, 11b are in direct data communication. It may also be desirable to enable a computer 11 to effectively be part of a private network 16 to which it does not already belong. Such a connection may be analogous to a network tunnel; that is, the functionality described herein may be similar, or equivalent, to known tunnelling protocols.

Figure 3:
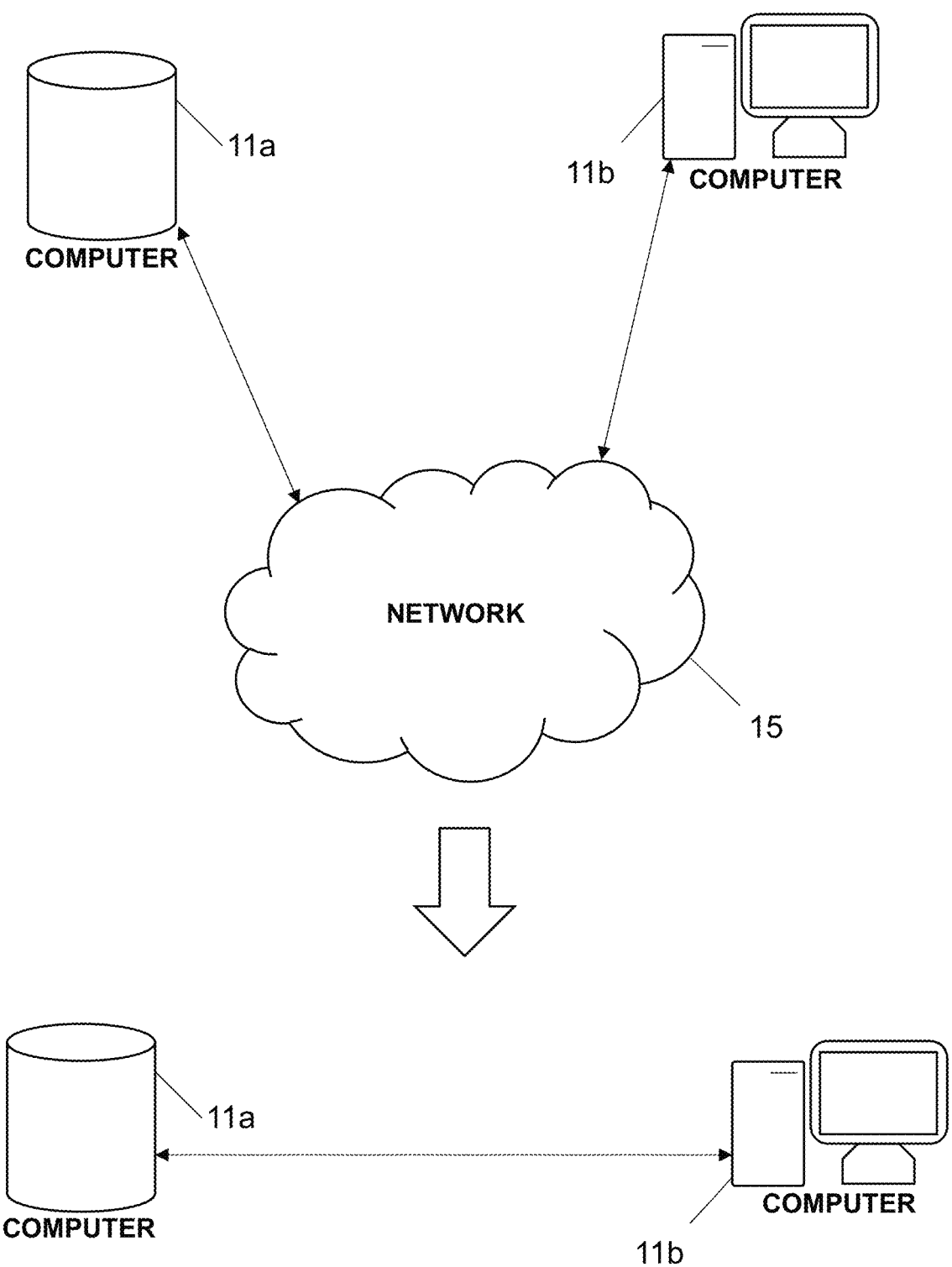
FIG. 3 shows data communication between two computers.

Referring to FIG. 3, for ease of description, it is desired to initiate and maintain data communication between computers 11a and 11b. The microtunnel is represented as a directed connection by the broken line arrows. To differentiate between these computers 11a, 11b, the labels "first" and "second" are used, not only to refer to the first computer 11a and second computer 11b, but also to the various features of the computers 11a, 11b. It should be understood that the terms "first" and "second" do not imply a particular ordering and that there can be multiple "first" and "second" features associated with the relevant computer 11a, 11b. The figure shows the computers 11a and 11b as a server and a desktop, respectively. Of course, the particular computing device is not intended to be limiting to these examples.

Figure 4:
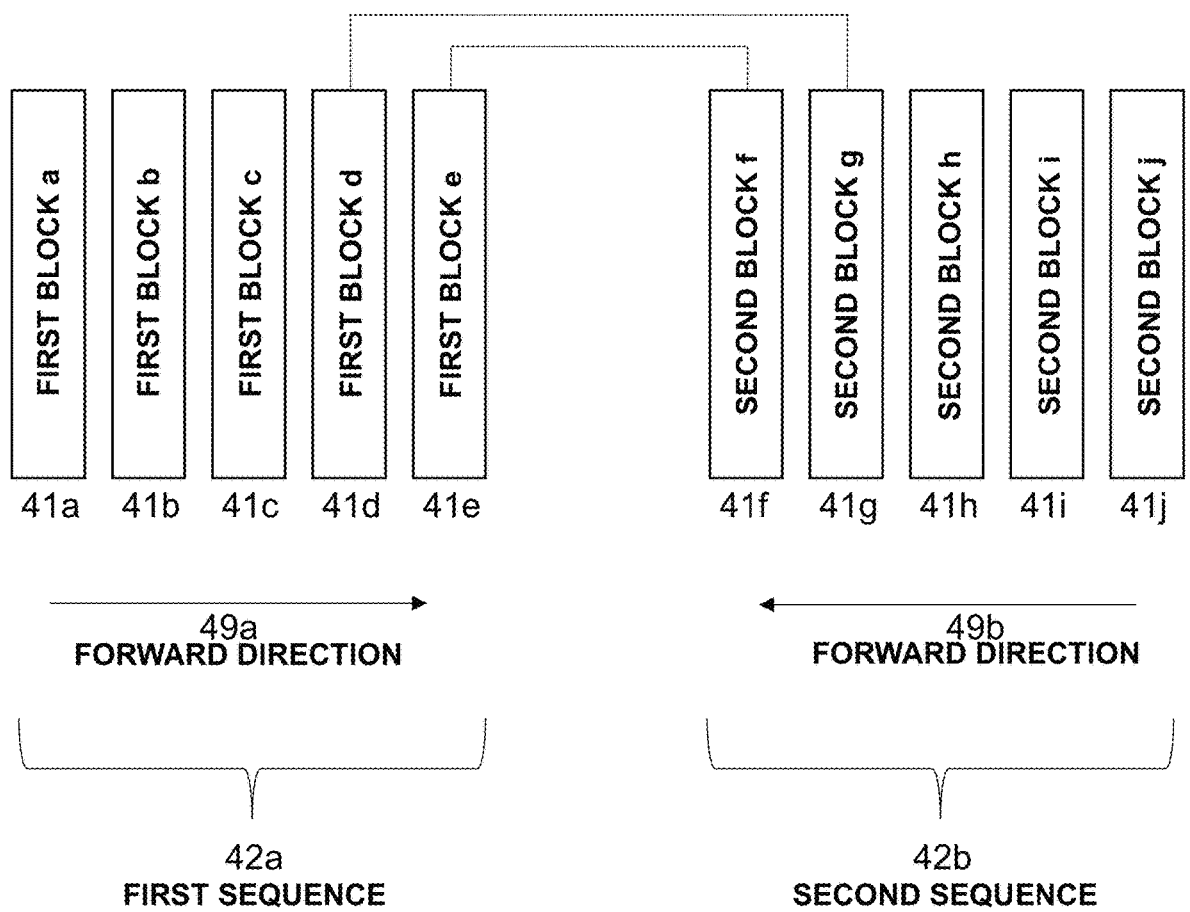
FIG. 4 shows a schematic representation of a plurality of blocks.

FIG. 4 shows a schematic representation of a plurality of blocks 41, according to an embodiment. Each block 41 is a conceptualization of a configurable protocol or other software/algorithm (herein collectively referred to as "protocols" or "data communication functions") for use in initialization and/or ongoing data communication between the two computers 11a and 11b—that is, each block 41 is configurable and plays a role in the data communication between computers 11a and 11b. Each block 41 is associated with one or more attributes defining an operation of the block 41.

According to an embodiment, the block attributes can define block types for each block 41. In the embodiments described herein, the block types include "encapsulating blocks" and "non-encapsulating blocks".

An encapsulating block type corresponds to a protocol that is utilized during ongoing data communication between the two computers 11a and 11b—that is, after initialization of the data communication. Generally, the encapsulating blocks are also involved with initializing the data communication—for example, the encapsulating blocks generally require configuration for use with the data communication. On the other hand, a non-encapsulating block type corresponds to a protocol that is utilized only during initialization of the data communication. Therefore, non-encapsulating blocks are not utilised for ongoing communications via the initialized data communication.

FIG. 4 shows the blocks 41 arranged into two sequences 42 of blocks 41-namely, a first sequence 42a including first blocks 41a-41e and a second sequence 42b including second blocks 41f-41j. The first blocks 41a are associated with the first computer 11a whereas the second blocks 41f-41j are associated with the second computer 11b. According to an embodiment, at least one of the first blocks 41a-41e has a paired second block 41f-41j, as indicated by the connected dotted lines. In the example shown, first block.

According to an embodiment, the first sequence 42a is a data structure defining an ordered plurality of the first blocks 41a-41e—conceptually, each first block 41a-41e is arranged such that it is positioned next to another first block 41a-41e, either in a forward direction, a reverse direction, or both.

More particularly, only end first blocks 41a and 41e are only adjacent one first block 41b, 41d (respectively). The "forward direction" is indicated by the direction of the arrow 49a. Similarly, the second sequence 42b is a data structure defining an ordered plurality of the second blocks 41f-41j—conceptually, each second block 41f-41j is arranged such that it is positioned next to another second block 41f-41j, either in a forward direction, a reverse direction, or both. More particularly, only end second blocks 41f and 41j are only adjacent one second block 41g, 41i (respectively). The "forward direction" is indicated by the direction of the arrow 49b. The data structures can therefore correspond to doubly-linked lists.

The data structures can be created via a data structure creation process on each computer 11—for example, an application can be provided configured to accept configuration parameter entries (from user input, a file, or other known mechanisms) and to create the data structures in a valid format. In another example, a user may, via user input, directly create the data structures. In another example, the data structures are provided from an external source—for example, a user of one computer 11a may communicate the data structure over a communication means (e.g. network 15) or via a storage, such as a USB storage, to another computer 11b. Each sequence 42 is associated with configuration data—this can be incorporated into the data structure of the sequence 42 or can be stored separately—in fact, a combination of these options may be utilized. Additionally, at least a portion of the configuration data may be provided from an external source, for example, a user input. Therefore, the data structure defines the protocols of each block 41 of the sequence and the ordering of the blocks 41, while the configuration data defines parameters for configuring the protocols associated with the blocks 41.

Generally, once the data communication is initialized, the protocols defined by the encapsulating blocks 41 can receive data, encapsulate or take other data processing actions according to the protocol and its configuration, and pass this processed data to the next block 41. The data can be passed via a binary stream interface (for example).

Figure 5:
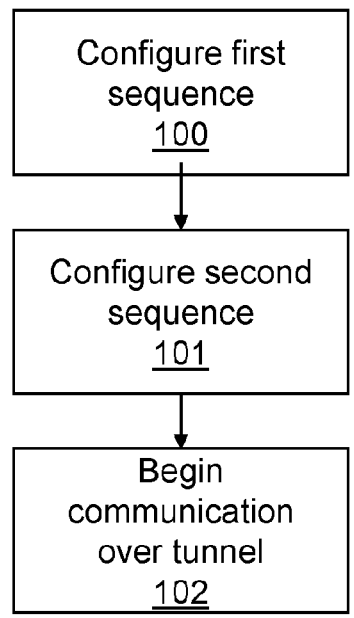
FIG. 5 shows a method for initiating data communication according to an embodiment in accordance with the present invention.

FIG. 5 shows a method for initiating data communication, according to an embodiment, utilising the blocks 41 described above. The method can be implemented by control software running on each computer 11a, 11b—that is, first control software running on the first computer a and second control software running on the second computer 11b.

Step 100 corresponds to configuring a first sequence 42a in a memory of the first computer a and step 101 corresponds to configuring a second sequence 42b in a memory of the second computer 11b. Of course, steps 100 and 101 can be performed in any order or even simultaneously.

According to an embodiment, a block pair includes one of the first blocks 41a-41e and one of the second blocks 41f-41j having complementary protocol configurations (e.g. defining the same protocol, configured such that the protocols on the two computers 11a, 11b are enabled to interact with one another). For example, first block 41e may be a TCP client and second block 41f may be a TCP server, such that a TCP connection can be created between the two blocks 41e, 41f, and therefore, computers 11a and 11b are able to communicate with one another. In another example, first block 41d may be an AES encryption client and a second block 41g may be an AES encryption server. In general, there can be one or more block pairs.

According to an embodiment, initialization includes processing of each of the first sequence and second sequence by the respective control software running on each computer 11a, 11b.

Figure 6A:
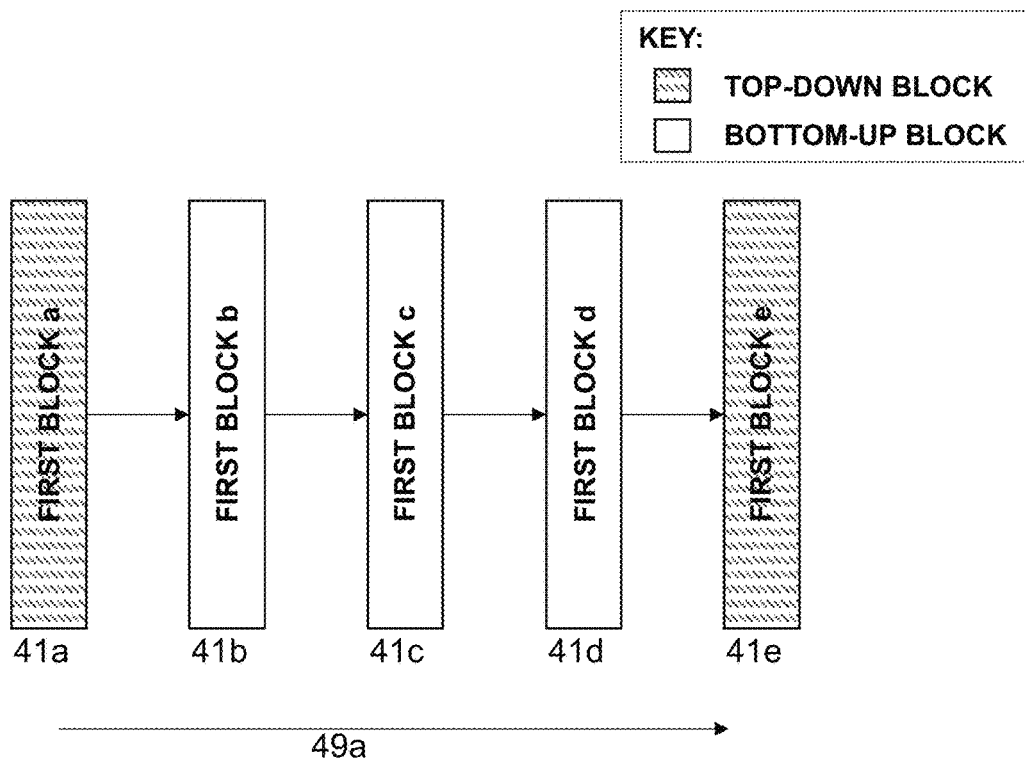
FIGS. 6a and 6b show an order of processing of first blocks and second blocks, respectively.
Figure 6B:
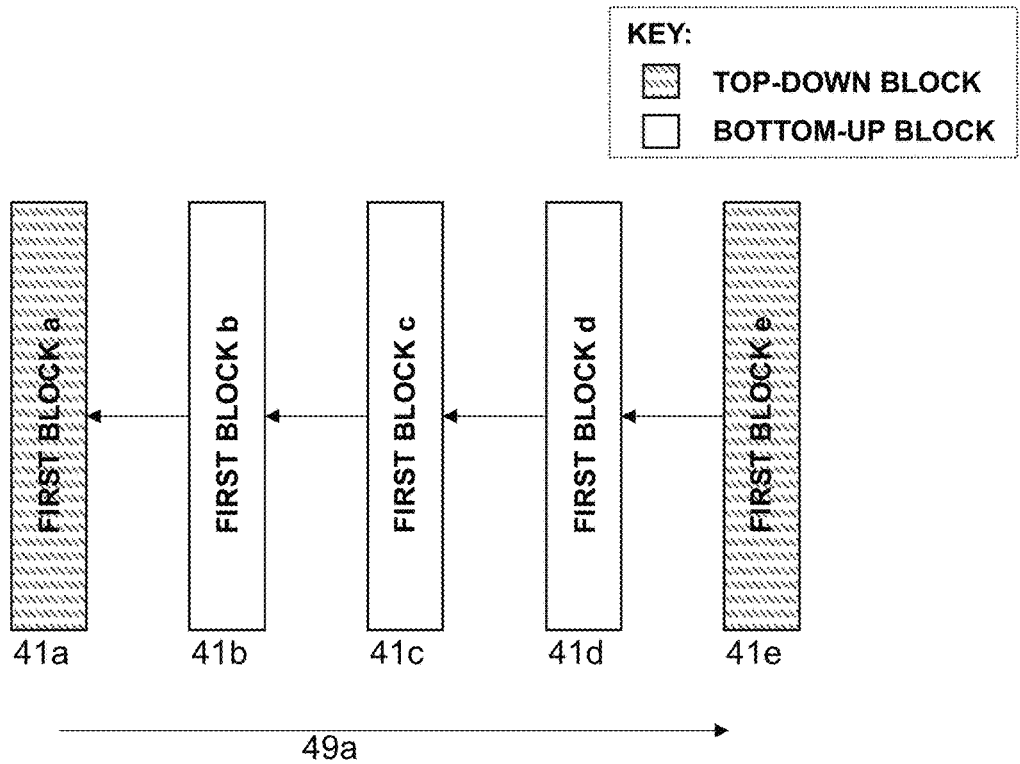

In an embodiment, as shown in FIG. 6a, processing the first sequence 42a includes the first control software moving through the first sequence 42a in the forward direction followed by moving through the first sequence 42a in the reverse direction. Each first block 41a-41e has a direction attribute defining whether it is processed when moving in the forward direction ("top-down") or in the reverse direction ("bottom-up"). Although not described explicitly herein, it is expected that some first blocks 41a-41e may be associated with both the forward and the reverse direction. Similarly, according to this embodiment as shown in FIG. 6b, processing the second sequence 42b includes the second control software moving through the second sequence 42b in the forward direction (top-down) followed by moving through the second sequence 42b in the reverse direction ("bottom-up"). In the figures, the shaded blocks 41 are top-down blocks whereas the non-shaded blocks 41 are bottom-up blocks 41. The top-most block is the beginning block 41 in a sequence when progressing in the top-down direction and the bottom-most block is the final block 41 in the sequence when progressing in the same direction. Thus, blocks 41a and 41j are both top-most blocks and blocks 41e and 41f are both bottom-most blocks.

The concepts of "top-down" and "bottom-up" provide a conceptual link between the order of data flow and the order of initialization.

In an embodiment, as shown in FIG. 6a, processing the first sequence 42a comprises the first control software moving through the first sequence 42a in the forward direction followed by moving through the first sequence 42a in the reverse direction. Each first block 41a-41e has a direction attribute defining whether it is processed when moving in the forward direction ("top-down") or in the reverse direction ("bottom-up"). Although not described explicitly herein, it is expected that some first blocks 41a-41e may be associated with both the forward and the reverse direction. Similarly, according to this embodiment as shown in FIG. 6b, processing the second sequence 42b comprises the second control software moving through the second sequence 42b in the forward direction (top-down) followed by moving through the second sequence 42b in the reverse direction ("bottom-up"). In the figures, the shaded blocks 41 are top-down blocks whereas the non-shaded blocks 41 are bottom-up blocks 41. The top-most block is the beginning block 41 in a sequence when progressing in the top-down direction and the bottom-most block is the final block 41 in the sequence when progressing in the same direction. Thus, blocks 41a and 41j are both top-most blocks and blocks 41e and 41f are both bottom-most blocks.

The concepts of "top-down" and "bottom-up" provide a conceptual link between the order of data flow and the order of initialisation.

In another embodiment, each block 41 is read in sequence. In this case, the ordering of the blocks 41 in the data structure may be different to the conceptual ordering described in relation to the previous embodiment. However, the ordering is instead selected such that, as the blocks 41 are processed according to an intended order of initiation, which may differ from the conceptual ordering of the data flow.

Figure 7:
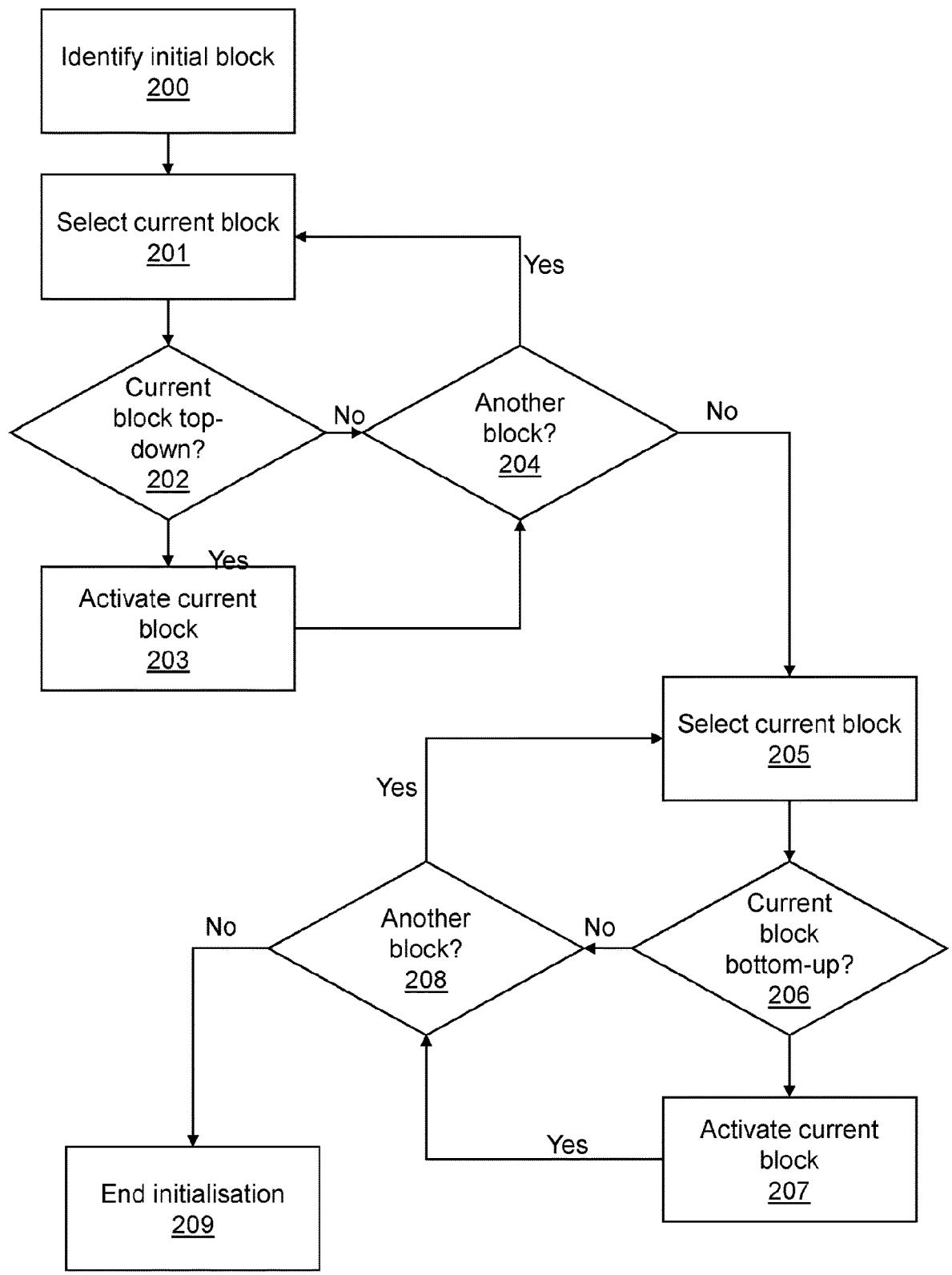
FIG. 7 shows an initialization method in accordance with the present invention.

FIG. 7 shows an initialisation method (that is, corresponding to step 103), according to an embodiment, carried out by the first computer 11a. Generally, the same method can be implemented by the second computer 11b—reference is made to the first computer 11a merely for ease of description. The initial first block 41a is identified at step 200—this is block 41a with only a forward connection. Then each first block 41a-41e is checked in a forward direction (i.e. 41a→41b→41c→41d→41e), as described below. In an embodiment, the first control software reads the first data structure to identify the initial first block 41a.

A current block 41 is selected at step 201—to begin with, this is the initial first block 41a. A check step 202 is then made: this corresponds to checking whether the current first block 41 is a top-down block type. If the current first block 41 is not a top-down block type, the method proceeds to step 204.

If the current first block 41 is a top-down block type, it undergoes an activation process at step 203. The particular activation process depends on the protocol associated with the current block 41. Additionally, the activation will typically depend on predefined block parameters associated with the current block 41. Additionally, activation can depend on data communicated to the current block 41 from a previous block 41 in the activation sequence. In some instances, activation may require reception of activation data from another computer 11—which may in some cases be the second computer 11b. Examples of protocol activations are described below. Once activation of the protocol associated with the current block 41 is complete, the method proceeds to step 204. Typically, the first control software causes activation of the protocol associated with the current first block 41 in accordance with the block parameters associated with the current first block 41.

At step 204, a check is made as to whether there is another linked first block 41 in the downward direction—if not, the method proceeds to step 205. If there is, the method returns to step 201 and this next block 41 becomes the current block 41. In this way, the first control software proceeds to check whether each first block 41a-41e corresponds to a top-down block type in sequence from first block 41a to first block 41e. In an embodiment, the initial first block 41a is assumed to be a top-down block type without an explicit check being made.

The first control software then proceeds to check each first block 41a-41e in the reverse direction (i.e. 41e→41d→41c→41b→41a). First block 41e is selected as the current block at step 205, and a check step 206 is then made: this corresponds to checking whether the current first block 41 is a bottom-up block type. If the current first block 41 is not a bottom-up block type, the method proceeds to step 208.

If the current first block 41 is a bottom-up block type, it undergoes an activation process at step 204. As before, the particular activation process depends on the protocol associated with the current block 41. Additionally, the activation will typically depend on predefined block parameters associated with the current block 41. Additionally, activation can depend on data communicated to the current block 41 from a previous block 41 in the activation sequence. In some instances, activation may require reception of activation data from another computer 11—which may in some cases be the second computer 11b. Examples of protocol activations are described below. Once activation of the protocol associated with the current block 41 is complete, the method proceeds to step 204. Typically, the first control software causes activation of the protocol associated with the current first block 41 in accordance with the block parameters associated with the current first block 41.

At step 208, a check is made as to whether there is another linked first block 41 in the backward direction—if not, the method proceeds to step 209 (end). If there is, this becomes the current block 41, with the method returning to step 205. In this way, the control software proceeds to check whether each first block 41 corresponds to a bottom-up block type in sequence from the final first block 41 to the initial first block 41.

It should be noted that the methods of FIGS. 5 and 7 may fail at any point, in particular, during initialization of any one block 41. For example, due to a time-out, an authentication failure, a network failure, or for other relevant reason(s). The failure may be determined by the relevant control software. Failure is not shown as a step, but in general, a notification may be provided (e.g. via a messaging service, a pop-up graphic box, a test code, a logfile entry, or other known means) indicating that the failure has occurred and optionally providing information relating to the failure. The method will typically cease upon an initialisation failure and the data communication will not be initiated.

Regarding protocol activation, encapsulating blocks 41 in effect remain in operation after the method of FIG. 7—that is, the encapsulating blocks 41 correspond to protocols utilised for ongoing data communication at step 104. However, non-encapsulating blocks 41 are not maintained in operation—these are only relevant to the initialisation of the data communication.

Relevantly, the particular protocols utilised for the data communication are defined by the first sequence 42a and the second sequence 42b (which may be complementary or at least include one or more paired blocks 41). The first sequence 42a and second sequence 42b are data structures configurable in software—that is, it is intended that the first sequence and the second sequence are defined on an as-needed basis. Therefore, data communication utilising different protocols and initialisation parameters can be defined via a software configuration, and each protocol is available for selection and configuration.

Encapsulating blocks 41 define ongoing protocols in that the protocols contribute to the ongoing data communication between the first and second computers 11a, 11b. Typically, these protocols correspond to known networking and data communication protocols such as TCP, HTTP, TLS, AES, etc. However, any suitable protocol may be applicable. Therefore, the activation of an encapsulating block 41 typically corresponds to configuring, for example by the relevant control software, the associated protocol for the particular session of data communication. This may involve, in various examples, assigning a target IP address, a target port, an encryption key, etc.

Figure 8:
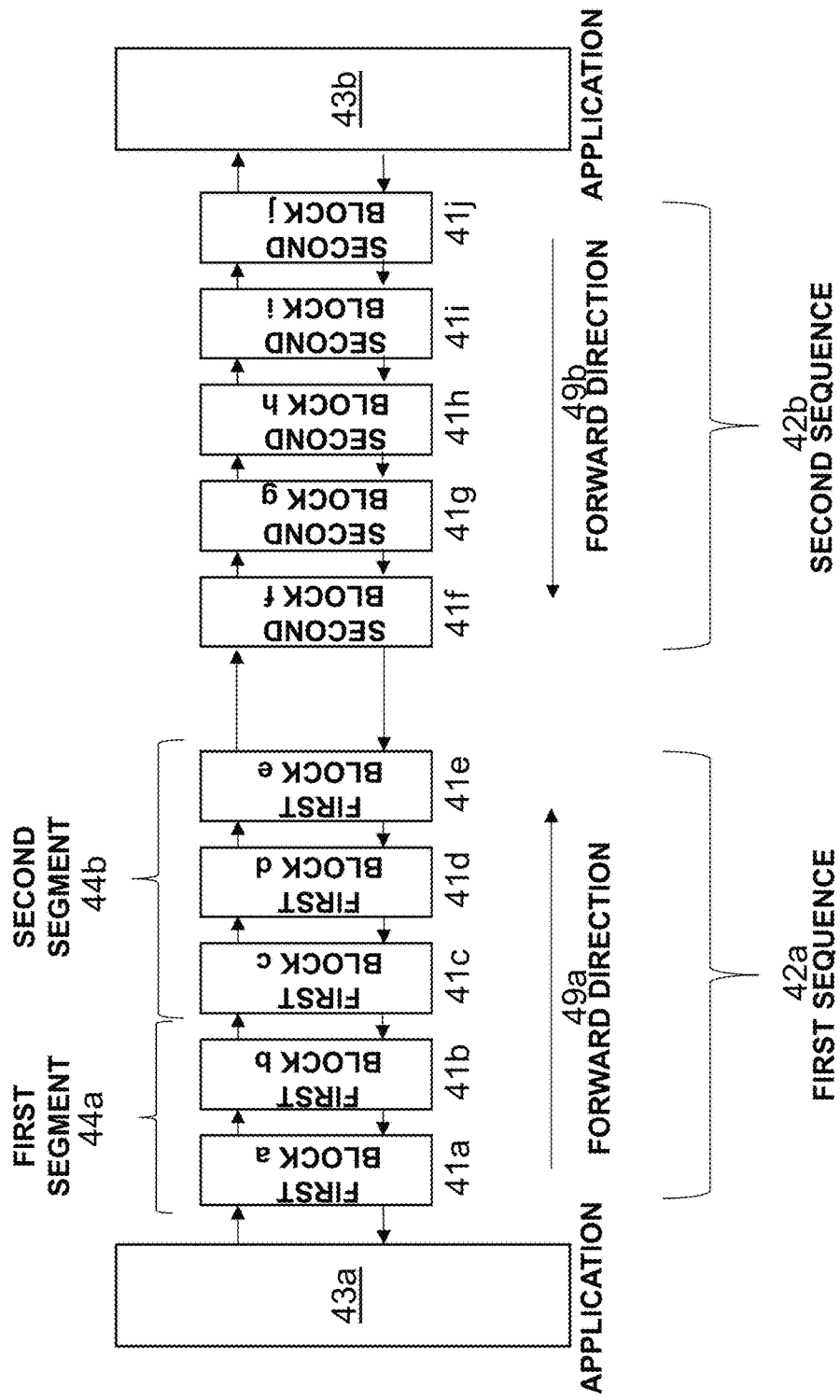
FIG. 8 shows a schematic representation of data communication during operation, according to an embodiment in accordance with the present invention.

FIG. 8 shows a schematic representation of data communication during operation, where the data communication connects applications 43a and 43b running, respectively, on computers 11a and 11b. Due to the nature of the data communication, blocks 41b-41i are, in effect, invisible to the applications 43. Each application 43 is simply configured to communicate with respective blocks 41a and 41j. First block 41a can therefore be termed an originating first block 41a and second block 41j can be termed an originating second block 41g. The example of FIG. 8 assumes blocks 41a-41j are each encapsulating block types (hence, are involved in ongoing operation of the data communication).

According to an embodiment, as exemplified in FIG. 8, a sequence 42 can include blocks 41 associated with different segments 44. The first sequence 42a includes first blocks 41a-41c associated with a first segment 44a and first blocks 41d-41e associated with a second segment 44b (of course, there may be more than two segments 44). The segments 44a, 44b define first blocks 41a-41c, 41d-41e associated with separate communication functions—in this sense, a sequence 42 acts to bridge communication between two separate applications and/or protocols.

In an embodiment, at least some of the blocks 41 of a particular sequence 42 may be initialized asynchronously—that is, the control software may be configured to cause initialization of these blocks 41 without regard to the order in which they are initialized. In such a variation, the control software may be configured to subsequently provide the output of one block 41 to the input of another block 41 such that, once complete, the data flow occurs according to the correct encapsulation order (for example). However, it may be considered that such blocks 41 are not completely initialized until the bitstreams are connected—from this view, the blocks 41 are partially initialized asynchronously. The relevant blocks 41 for interconnection between segments 44 can be considered those encapsulating blocks 41 "next" to each other within the sequence 42.

In a particular example, the blocks 41a-41c of a first segment 44a may be initialized asynchronously with respect to the blocks 41d-41e of a second segment 44b. Once initialized, the blocks 41 are connected such that an output of a block 41 of one segment 44 (e.g. block 41c of the first segment 44a) is connected to the input of a block 41 of another segment 44 (e.g. block 41d of the second segment 44b).

Referring back to FIG. 8, the first segment 44a may be considered to be directed at communication with the application 43a whereas the second segment may be considered to be directed to communication with communication with the second computer 11b (i.e. with the second sequence 42b). Although not shown, a similar arrangement of segments 44 may be applicable to the second sequence 42b. An advantage of such an arrangement of segments 44 is that different data communication functions can be linked via a particular sequence 42.

An advantage of embodiments herein described may be that an administrator, for example a system administrator associated with one or more computers 11 involved in an instance of data communication, can configure specific arrangements—for example, having control to define transport protocols, security protocols, etc. The control is implemented by control software configured according to a data structure which ensures compatibility at both ends of the data communication (e.g. corresponding to computer 11a and computer 11b). That is, the instances of data communication are customizable.

Figure 9:
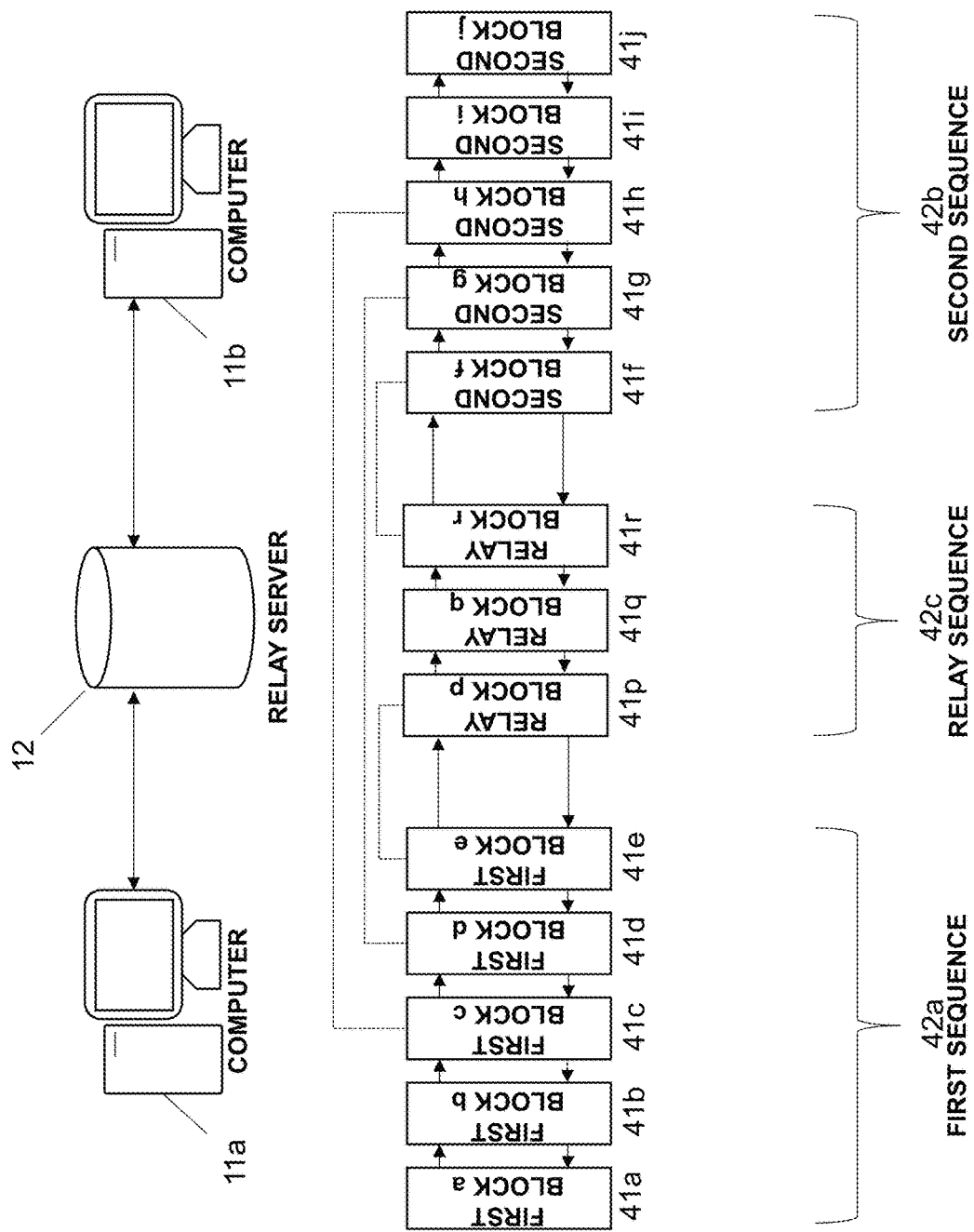
FIG. 9 shows an embodiment including a relay server.

FIG. 9 shows an embodiment comprising a relay server 12. In general, there can be multiple relay servers 12—one is shown merely for clarity. As with the computers 11, the relay server 12 can be any suitable computing device (including, for example, specialized computing devices such as network routers). The relay server 12 is configured for data communication with both the first computer 11a and the second computer 11b, usually via network 15. According to this embodiment, the relay server 12 facilitates data communication—that is, the relay server 12 is involved with ongoing data communication and therefore includes encapsulating block types. The relay server 12 (or each, where applicable) is associated with blocks 41, similar to the first computer 11a and the second computer 11b-therefore, the relay server 12 includes a data structure referred to herein as a relay sequence 42c defining its associated blocks 41.

In the figure, the first sequence 42a of the first computer 11a includes first blocks 41a-41e, the second sequence 42b of the second computer 11b includes second blocks 41f-41j, and the relay sequence 42c of the relay server 12 includes relay blocks 41p-41r. Generally, one or more of the first blocks 41 may be paired with a relay block 41—for example, as shown, first block 41e is paired with relay block 41p and second block 41f is paired with relay block 41r. Initialization is similar to that previously described, however, there is an additional initialization of the relay blocks 41p-41r, which can occur as per the initialization of first and second blocks 41a-41j. The relay server 12 is configured as part of the data communication-therefore, first block 41e is typically directed to communicated with relay block 41p and second block 41f is typically directed to communicate with relay block 41r. As shown, first block 41c is paired with second block 41h and first block 41d is paired with second block 41g-communication between these blocks 41c, 41h, 41d, 41g occurs via the relay server 12.

The embodiment can provide several advantages. For example, where computers 11a and 11b utilize different transport protocols, relay server 12 can provide for translation between the protocols (for example, via relay block 41q). Additionally, or alternatively, the relay server 12 could provide a logging function for recording communications between the first computer 11a and the second computer 11b. The relay server 12 can provide said functionality in a manner transparent to the applications 43. Another advantage may be that a relay server 12 may be accessible by one or both of computers 11a and 11b, whereas a direct connection between the computers 11a, 11b is disallowed via a firewall or other security measure.

Figure 10:
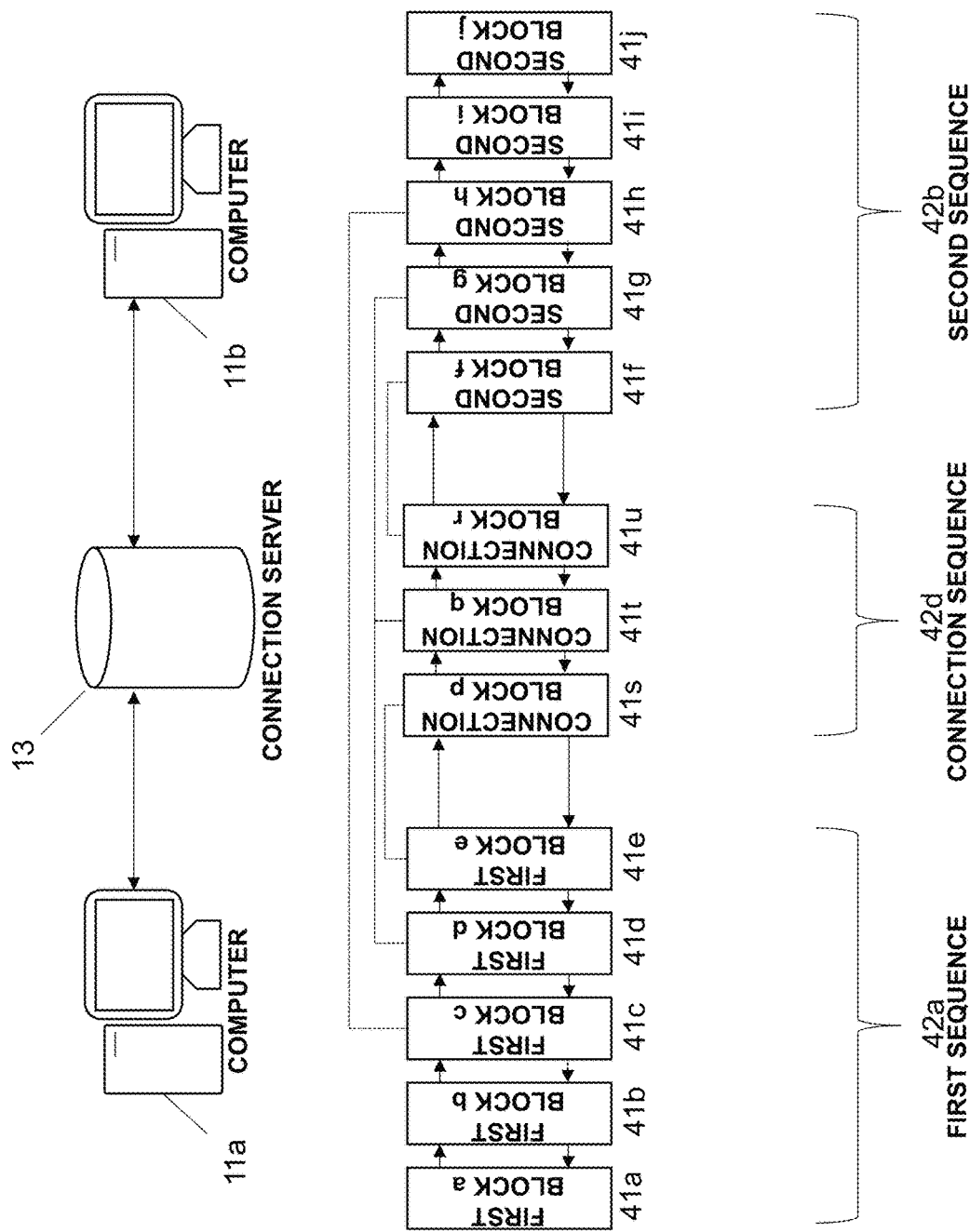
FIGS. 10 and 11 show an embodiment including a connection server.

FIG. 10 shows an embodiment including a connection server 13. The role of the connection server 13 in this embodiment is to contribute to the data communication-after initialization, it does not play a role (or may provide functionality of a relay server 12, which is described below). As with the computers 11, the connection server 13 can be any suitable computing device (including, for example, specialized computing devices such as network routers). In this sense, the connection server 12 is associated with at least one one-off protocol. The function of the connection server 13 can be combined with the function of a relay server 12 in a single computing device (e.g. server). Similar to the relay server 12, the connection server 13 may provide an advantage when direct connection (at least at the initialization stage) is not possible between the two computers 11a, 11b due to security protocols.

FIG. 10 shows the connection server 13 in data communication with both the first computer 11a and the second computer 11b (the data communication is typically via network 15, although, at least one computer 11 may correspond to the same computing device or may be provided within a private network 16 with the connection server 12). In the figure, the connection server 12 is shown "between" the first computer 11a and the second computer 11b. The purpose of the connection server 12 is to facilitate creating a connection between the first computer 11a and the second computer 11b.

FIG. 10 also shows a corresponding first sequence 42a of first blocks 41a-41e associated with the first computer 11a and second sequence 42b of second blocks 41f-41j associated with the second computer 11b, as well as additional connection blocks 41s-41u associated with a connection sequence 42d of the connection server 12. As can be seen, first blocks 41d and 41e of the first computer 11a are paired with connection blocks 41s and 41t of the connection server 12, rather than the second computer 11b. Similarly, second blocks 41f and 41g of the second computer 11b are paired with connection blocks 41t and 41u of the connection server 12, rather than the first computer 11a. It should be noted that first block 41s and second block 41g are both shown paired with connection block 41t—in practice, this may instead correspond to two pairings with two related connection blocks 41 which are simply represented as one block 41t in the figure.

During the initialization method of FIG. 7, the connection server 13 is configured to facilitate creation of a connection between the first computer 11a and the second computer 11b. It will be assumed that the second computer 11b is configured to advertise its availability for connection with the connection server 13, and the first computer 11a is configured to communicate with the connection server 13 in order to identify the publication of the second computer 11b. This approach is an example and should not be considered limiting.

In this case, for example, second block 41f is a top-down block and second block 41g is a bottom-up block. Therefore, second block 41f activates first and establishes a data connection with connection block 41u (these correspond to TCP protocols). Thus, a TCP session is created between the second computer 11b and the connection server 13. During the initialization of the connection server 13, connection block 41u is similarly activated before connection block 41t.

Next, second block 41g communicates with connection block 41t via the network connection established by second block 41f and connection block 41u. Connection block 41t corresponds to a "meet point", namely, a function configured to enable a "meeting" to occur between first computer 11a and second computer 11b. Therefore, connection block 41t is a non-encapsulating block—it is not involved in actual data communication. Second block 41g is a "meet publisher"—it is configured to communicate with the meet point (connection block 41t) in order to publish its availability to receive a connection. The publication includes identifying information to identify the particular instance of availability (e.g. a codename). Connection block 41t can be configured to maintain publication of availability for a predefined time or for a time defined in a communication from second block 41g—this may be one minute. If this time expires, then second block 41g can be required to communicate its availability again to connection block 41t.

On the other "side", computer 11a undergoes its own initialization. Here, first block 41e is a top-down block and first block 41d is a bottom-up block. Therefore, first block 41e activates first and establishes a data connection with connection block 41s (these again can correspond to TCP protocols). Thus, a TCP session is created between the first computer 11a and the connection server 13. During the initialization of the connection server 13, connection block 41s is similarly activated before connection block 41t.

Next, first block 41d communicates with connection block 41t via the network connection established by first block 41e and connection block 41s. First block 41d is a "meet subscriber"— it is configured to communicate with the meet point (connection block 41t) in order to identify a published availability for further connection. First block 41d communicates its request along with identifying information—this is configured to allow the meet point (connection block 41t) to match the first computer 11a to the second computer 11b. Said another way, the identifying information provided by both the first block 41d and the second block 41g to the connection block 41t enables the connection server 13 to determine that data communication should be initiated between the corresponding computers 11a, 11b.

After matching, the connection server 13 can be configured to manage assisting in data communication creation in different ways. For example, the TCP connections between the first computer a and the connection server 13 and the second computer 11b and the connection server 13 may be replaced with a direct TCP connection between the first computer a and the second computer 11b. In another example, the connection server 13 also implements a relay server 12, and proceeds to relay data between the first computer a and the second computer 11b. For example, connection control software operating on the connection server 13 can communicate updated information to the relevant TCP blocks 41 of the first and second computers 11a, 11b, thereby causing the two to begin communication with one another rather than the connection server 13.

Figure 11:
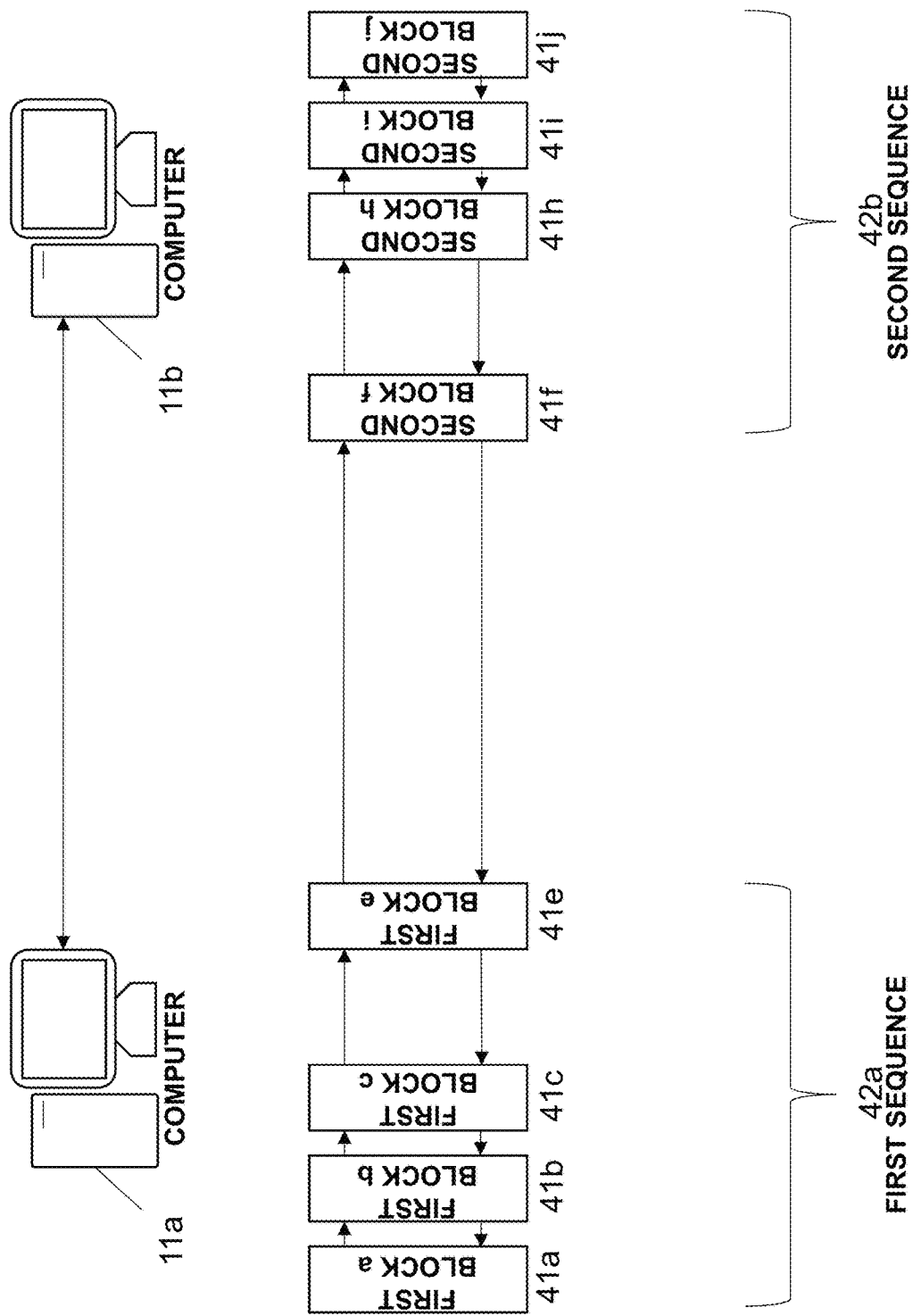

After the "meeting" is complete, both the first computer 11a and the second computer 11b can continue with their respective initialization methods. For example, the first sequence 42a may proceed to first block 41c and the second sequence 42b may proceed to second block 41h. Therefore, a result of the method is that first block 41d, second block 41g, and connection blocks 41s-41u are removed, this is shown in FIG. 11. FIG. 11 therefore provides an example of blocks 41 remaining after initialization of data communication—that is, only blocks 41 corresponding to encapsulating block types. Accordingly, the first and second control software are configured to proceed with the initialization process in response to the creation of the connection between the first computer 11a and the second computer 11b.

An advantage of utilizing a connection server 13 may be that computers 11a and 11b do not require any network knowledge of each other-all that is required is the common identifying information to enable the connection server 13 to facilitate the initialisation of the data communication. A connection server 13 may also assist in overcoming firewalls and NATs (for example) without requiring setting up of forwarding rules—as each computer 11a, 11b initiates a connection to the connection server 13, the appropriate routing rules can be created on the fly according to known techniques. In an embodiment, the connection server 13 is also a relay server 12, thereby ensuring continuing communication in the event of the presence of a firewall or NAT.

Figure 12A:
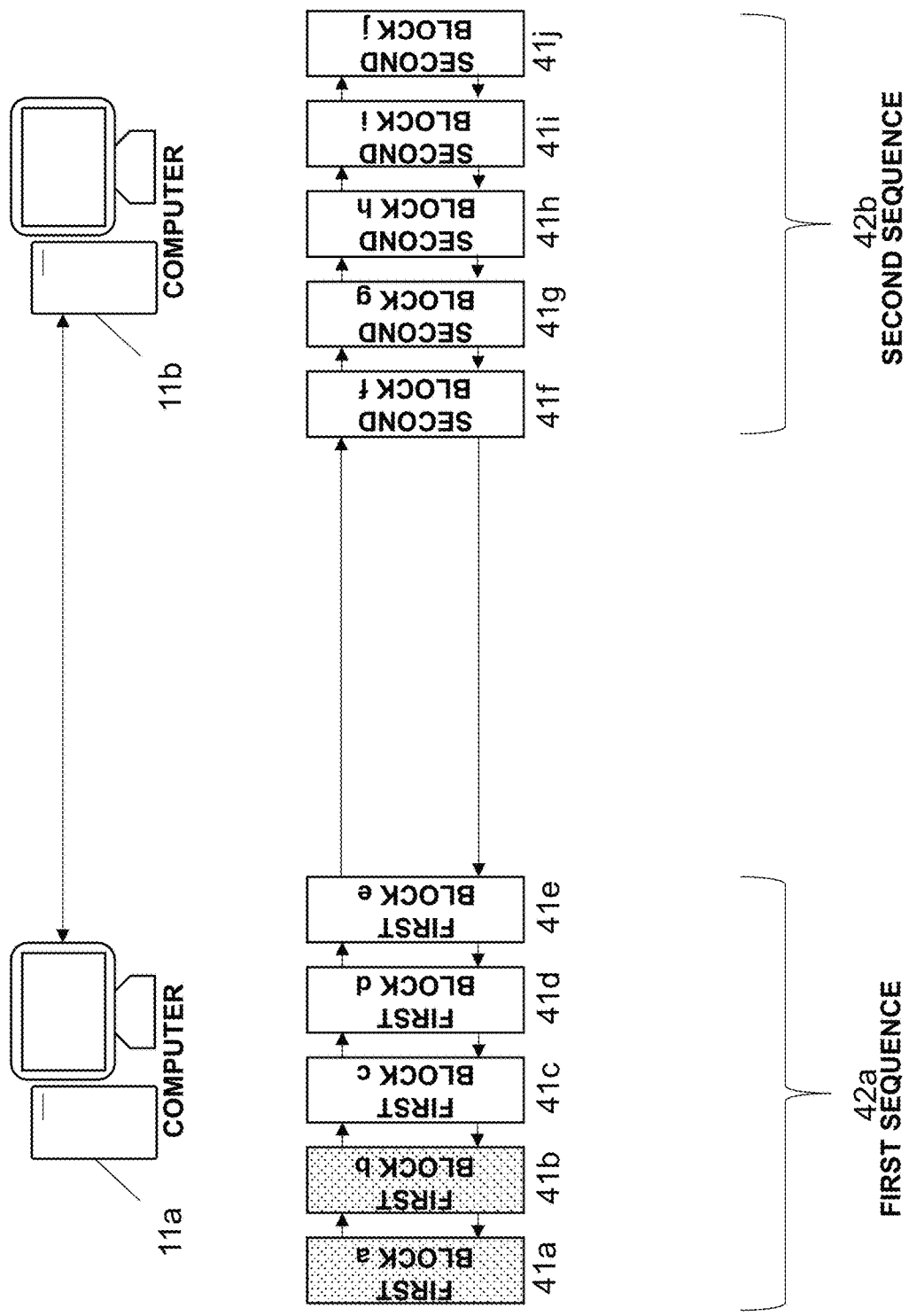
FIGS. 12a and 12b show an embodiment including an internal sequence as well as a first sequence.
Figure 12B:
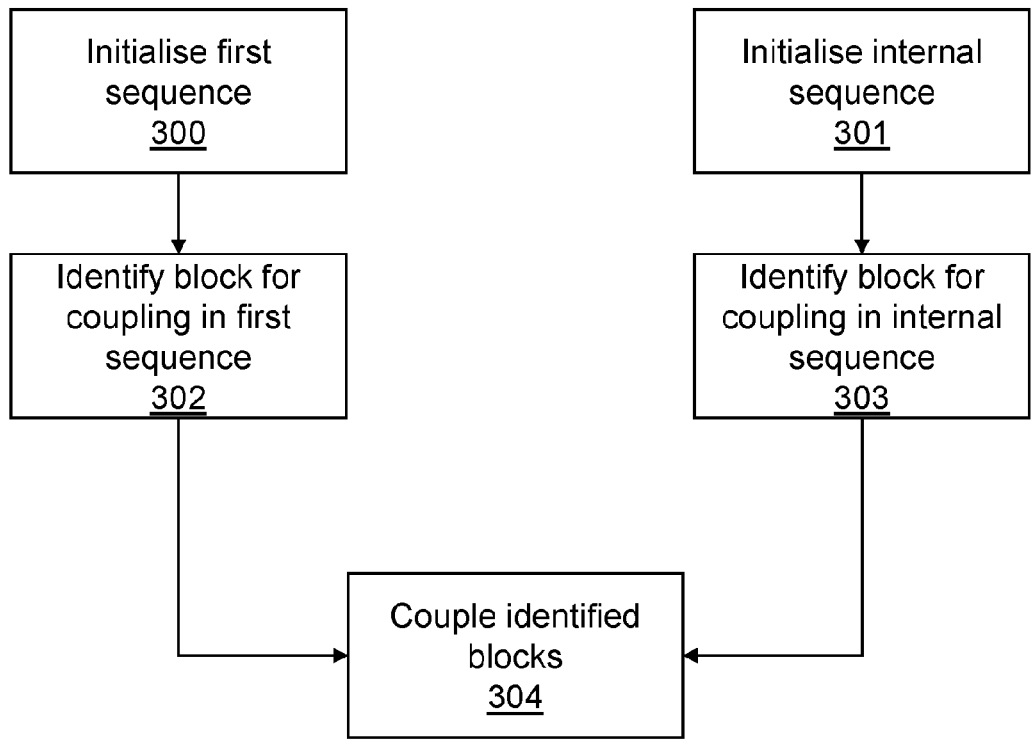

FIG. 12a shows an embodiment wherein the first sequence 42a includes first blocks 41a, 41b (shown shaded) which are not paired with second blocks 41g-41j. However, initialization of first blocks 41a and 41b follows the same method as blocks 41c-41e, for example, as described with reference to FIG. 7.

Initialization of a sequence 42 on a particular computer 11 can be occur in response to an activation command. In an embodiment, the activation command constitutes an explicit user action, for example, running a command via a command line or graphical user interface (GUI) to run the control software based on particular configuration data that can be provided by the user action (e.g. command-line parameters) and/or within a predefined file.

In another embodiment, a library accessible to applications running on an operating system can be configured to provide automatic data communication via the methods herein described—that is, the library is the control software or, alternatively, the library may call the control software. An application may be configurable to utilize the library when creating a network connection with another computer 11 (e.g. computer 11b when the library and application are running on computer 11a). The library is configured to cause initialization based on configuration data, at least a portion of which can be provided by the application calling the library.

In another embodiment, a loopback address on the computer 11 is bound such that a connection to that loopback address initiates the control software based on configuration data also associated with the loopback address. Loopback addresses are known in the art. In an example, in respect of IPv4, the loopback address can be in the range 127.0.0.0-127.255.255.255; although it may be preferred to limit to a subset of this range, for example 127.1.0.0-127.1.255.255.

It should be noted that these examples do not refer to an activation action on the (or each) other computer 11. Generally, these computers 11 are configurable with their own activation action in order to run the control software in order to initialize the associated sequence 42 (or sequences 42). This activation action, however, may be coupled to a communication received from another computer 11—for example, computer 11a may make a communication to computer 11b resulting in computer 11b initializing a sequence 42.

In an embodiment, a computer 11 can be configured with a TCP listener (that is, a TCP server) configured to listen on a particular port. Upon receiving a communication addressed to that port, the computer 11 is configured to begin initialization of a sequence 42 associated with that port—the association may be based on particular pre-defined configuration data.

The embodiments described herein may provide for customizable networking, where data connections between specific computers 11 (or other networked devices, for example printers) are controlled through software implemented on the computers 11. That is, features such as security (e.g. identity proofing and encryption) can be controlled at the level of the application layer as opposed to the transport or internet layers (see, for example, RFC 1122) on a connection-by-connection basis. Additionally, the data connections can be not only device targeted but also application targeted—this is possible as the connections between blocks 41 are configured in software and the transport layer is only responsible for transport (as opposed to security etc.). Such flexibility allows an administrator to provide quick and secure access to different devices.

Figure 13A:
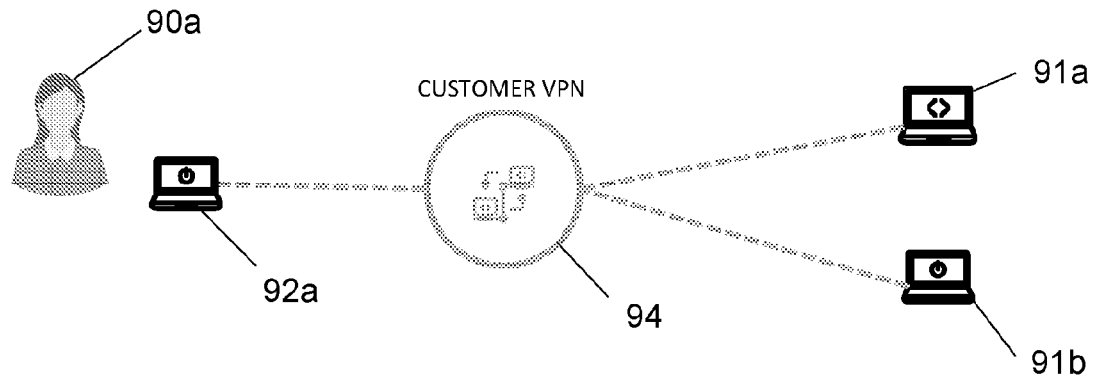
FIG. 13a shows a prior art example of a connection via a VPN and FIG. 13b shows a connection via data communication of the present embodiments.
Figure 13B:
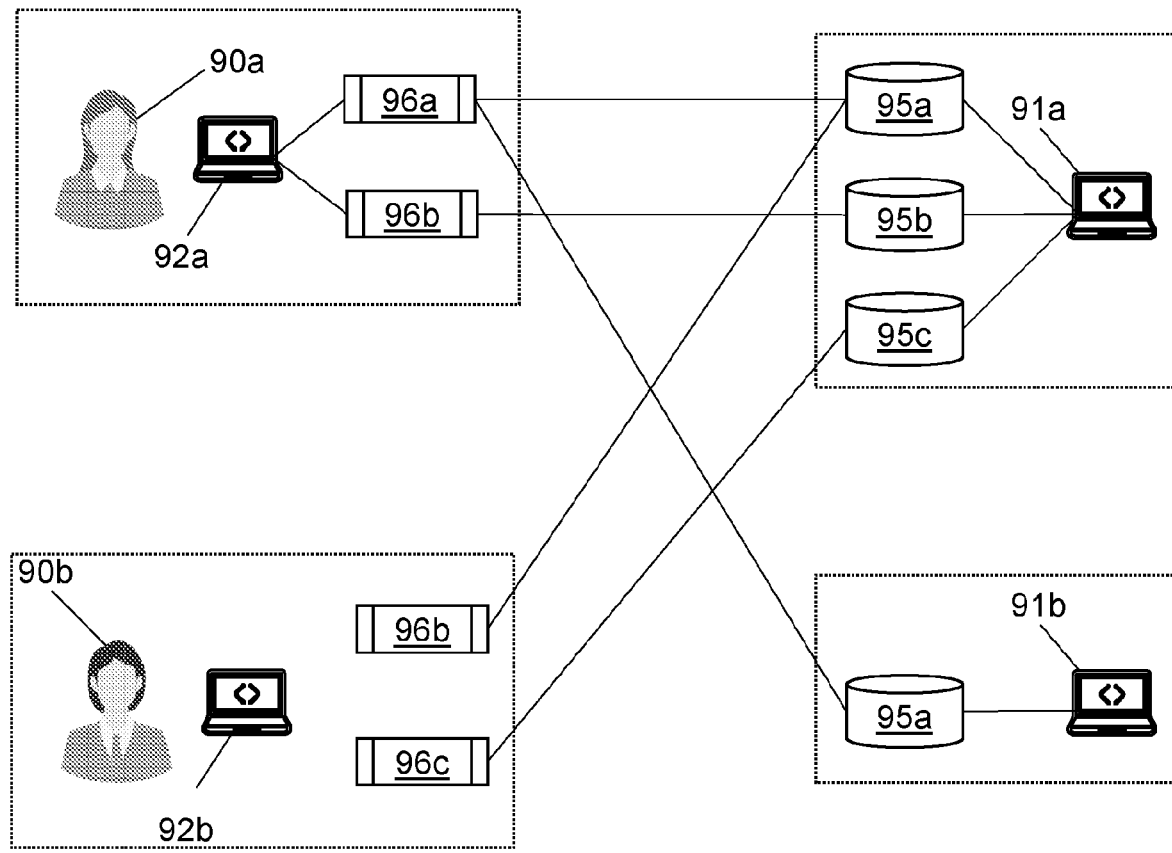

An example of an implementation of the embodiments described herein is shown in FIGS. 13a and 13b.

In the example, a user 90 requires access to an application running on a computer 91a on a private network 92. FIG. 13a shows a prior art example, where the user 90 connects using the user's computer 92a to the computer 91a via a VPN 94 associated with the computer 91a. The prior art technique suffers from several potential drawbacks—for example, the VPN 94 may be overly permissive, in that it may give access to the entire network-even if security is in place, this typically involves centralized processing with (potentially complicated) routing rules—a complex "smart" router may be required to handle directing of packets between the user's computer 92a and the computer 91a. For example, the user 90 may as a result have access to another computer 91b. The VPN 94 therefore represents a central point of failure. Another issue may be that the VPN 94 is required to implement significant overhead in the manner of packet inspection and routing. Finally, it might be difficult to isolate a particular application on the computer 91a for interaction by the user 90a.

In FIG. 13b, an implementation using the presently described embodiments is shown. Here, a user 90a requires access to an application 95a running on a computer 91a—for example, a VNC server. The embodiments herein described may be utilized to provide a data connection between the technician's computer and the application 95a (in fact, the data connection may specifically be between an application 96a running on the technician's computer and the application 95a, as shown)—this is one data connection. Then, the same user 90 during the same session may require access to another application 95b running on the computer 91a—for example, a file transfer server. The embodiments herein described may be utilized to provide another data connection between the technician's computer and the application 95b (in fact, the data connection may specifically be between an application 96b running on the technician's computer 92a and the application 95b, again as shown)—as shown in FIG. 13b, there are now two data connections linking the technician's computer 92a to the computer 91a. This process can be continued in order to create a customized network connection between the user's computer 92a and the computer 91a.

Next, consider a case where a second technician 90b requires access to an application 95c running on the computer 91a. Using the embodiments described herein, a data connection between the technician's computer 92b and the application 95c is created (in fact, the data connection may specifically be between an application 96c running on the technician's computer 92b and the application 95c, as shown)—this is yet another connection. Also, the second technician 90b may also require access to the first application 95a of the computer 91a (via an application 96a running on the technician's computer 92b).

Now, consider a case where the first technician 90a also requires a data connection to a second computer 91b—for example, to access another instance of the application 91a (e.g. a VNC server). The embodiments described herein can be utilised to create this data connection.

The illustration in FIG. 13b is intended to show how the data connections described herein can be built up to create a network of data connections targeting specific applications 95—that is, for example data connections between applications 95 and corresponding applications 96, running on different computers 91. These data connections are advantageously inherently secure due to the embodiments described herein—each data connection must be authorised and can only access the specific applications 95, 96. These data connections are defined in software. The approach may be considered to be a "bottom-up" approach to networking, focusing on the individual data connections defined in software.

The actual transmission of the data utilizes the transport layer and below (as per the OSI stack), however, security and authorization is not required to be handled at hardware—in effect, the transport layer is only required to provide transport of data packets. An advantage of the embodiments herein described may be, in certain implementations, a reduced complexity of networking hardware as a result.

The connections described herein can therefore be considered to be the interaction of one or more (typically a plurality) of data connections—that is, direct connections between computers 11 that ensure that only the particular computers 11, and optionally, applications on those computers 11 are accessible by another party. Through the use of the segments 42 and blocks 41 (correspondingly, the protocols associated with the blocks 41), secure connections can be authorized and created on an as-needed basis due to being defined in software and the transport layer is only required to communicate data between certain blocks 41.

In an example, the embodiments described herein allow for distributed data monitoring. In a prior art system such as shown in FIG. 13a, the VPN 94 may be configured to record the data flows between the computers 91a, 91b and 92a—however, this will, for at least one entity, constitute a third party, thereby creating an issue of trust. According to the embodiments herein described, a sequence 42 can be configured with a logging block 41—that is, a block 41 associated with computer software configured to record data being communicated. Such a logging block 41 can therefore be configured for each data communication and according to the requirements of an organisation associated with the sequence 42. Typically, such a block 41 will be located between an application 95, 96 and any encryption blocks 41 of the sequence 42. Thus, both organisations associated with a data communication can facilitate data recording according to its own policies, without relying on a third party.

Further modifications can be made without departing from the spirit and scope of the specification. For example, configuration of individual blocks 41 can be restricted by a system operator to a subset of possible configurations.

The invention claimed is:

1. A method for data communication via a network, the method comprising:
   configuring, on a first computer, a first sequence comprising an ordered plurality of first blocks associated with at least one segment; and
   initializing the ordered plurality of first blocks and undertaking data communication between the first computer and a second computer;
   configuring, on the second computer, a second sequence comprising an ordered plurality of second blocks associated with at least the first segment and the second segment, wherein each of one or more of the ordered plurality of second blocks is uniquely associated with a first block of the one or more plurality first blocks; and
   initializing the ordered plurality of second blocks and undertaking data communication between the first computer and the second computer;
   wherein each second block of the ordered plurality of second blocks represents a configurable data communication function and wherein each of the ordered plurality of first blocks represents a configurable data communication function; and
   wherein one or more first blocks of the ordered plurality of first blocks and one or more second blocks of the ordered plurality of second blocks associated with communication functions configured to communicate with a connection server, wherein at least one first block of the ordered plurality of first blocks and at least one second block of the ordered plurality of second blocks associated with communication functions configured to communicate with the connection server is only used for initializing the data communication.

2. The method of claim 1, further comprising:
   assigning one or more of the ordered plurality of first blocks to a first segment and one or more other ones of the ordered plurality of first blocks to a second segment;
   initializing the one or more of the ordered plurality of first blocks of the first segment and initializing the one or more other ones of the ordered plurality of first blocks of the second segment; and
   subsequently causing a data communication between a first block of the first segment and a first block of the second segment.

3. The method of claim 2, wherein:
   at least one of the first segment and the second segment is associated with data communication with an application running on the first computer; and
   wherein at least one of the first segment and the second segment is associated with data communication with the second computer or another computer over a data network.

4. The method of claim 1, wherein initializing the ordered plurality of first blocks and the ordered plurality of second blocks comprises traversing each separately in a respective first direction only, wherein traversing comprises activating the communication functions associated with the ordered plurality of first blocks and the ordered plurality of second blocks according to activation rules.

5. The method of claim 1, wherein:
   at least one of the ordered plurality of first blocks and/or at least one of the ordered plurality of second blocks is configured as an encapsulating block type, such that the communication functions associated with the configured at least one of the ordered plurality of first blocks and the configured at least one of the ordered plurality of second blocks undertake the data communication after initialization; and
   wherein at least one first block of the ordered plurality of first blocks and/or at least one second block of the ordered plurality of second blocks is configured as a non-encapsulating block type, such that the configurable communication functions associated with the configured at least one of the order plurality of first blocks and at least one of the ordered plurality of second blocks do not take part in the data communication after initialization.

6. The method of claim 1, wherein at least one first block of the ordered plurality of first blocks is an originating first block configured to interact with an application running on the first computer and/or wherein at least one second block of the ordered plurality of second blocks is an originating second block configured to interact with an application running on the second computer, wherein the data communication is between a first application running on the first computer and a second application running on the second computer.

7. The method of claim 1, further comprising one or more of the ordered plurality of first blocks and one or more of the ordered plurality of second blocks associated with communication functions configured to communicate with at least one relay server, wherein the ordered plurality of first blocks of the first sequence and the ordered plurality of second blocks of the second sequence communicate with the network via the first blocks of the ordered plurality of first blocks and second blocks of the ordered plurality of second blocks configured to communicate with the at least one relay server.

8. The method of claim 1, wherein initializing the ordered plurality of first blocks of a segment and/or the ordered plurality of second blocks of a segment comprises traversing each separately in a first direction followed by traversing in an opposite second direction, wherein traversing comprises activating the communication functions associated with the ordered plurality of first blocks and the ordered plurality of second blocks according to activation rules, wherein each one of the ordered plurality of first blocks and each one of the ordered plurality of second blocks is configurable as a top-down block type or a bottom-up block type, and an activation rule is such that only the communication functions associated with the ordered plurality of first blocks and the ordered plurality of second blocks of the top-down block type are activated when traversed in the first direction and such that only the communication functions associated with the ordered plurality of first blocks and the ordered plurality of second blocks of the bottom-up type are activated when traversed in the second direction.

9. A method for data communication via a network, the method comprising:

configuring, on a first computer, a first sequence comprising an ordered plurality of first blocks associated with at least one segment; and initializing the ordered plurality of first blocks and undertaking data communication between the first computer and a second computer;

configuring, on the second computer, a second sequence comprising an ordered plurality of second blocks associated with at least the first segment and the second segment, wherein each of one or more of the ordered plurality of second blocks is uniquely associated with a first block of the one or more plurality first blocks; and initializing the ordered plurality of second blocks and undertaking data communication between the first computer and the second computer;

wherein each second block of the ordered plurality of second blocks represents a configurable data communication function and wherein each of the ordered plurality of first blocks represents a configurable data communication function; and wherein one or more of the ordered plurality of first blocks and one or more of the ordered plurality of second blocks associated with communication functions configured to communicate with at least one relay server, wherein the ordered plurality of first blocks of the first sequence and the ordered plurality of second blocks of the second sequence communicate with the network via the first blocks of the ordered plurality of first blocks and second blocks of the ordered plurality of second blocks configured to communicate with the at least one relay server.

10. A system comprising a first computer, wherein the first computer is configured to:

generate a first sequence comprising an ordered plurality of first blocks associated with at least one segment;

initialize the ordered plurality of first blocks according to the first sequence;

undertake data communication with a second computer according to the initialize the ordered plurality of first blocks, wherein each of the ordered plurality of first blocks-represents a configurable data communication function;

the second computer which is configured to:

generate a second sequence comprising an ordered plurality of second blocks associated with at least the first segment and the second segment;

initialize the ordered plurality of second blocks according to the second sequence; and undertake data communicate with the first computer according to the initialized the ordered plurality of second blocks, wherein each of at least one of the ordered plurality of second blocks is uniquely associated with a first block of the one or more ordered plurality of first blocks; and wherein one or more of the ordered plurality of first blocks and one or more of the ordered plurality of second blocks associated with communication functions configured to communicate with at least one relay server, wherein the ordered plurality of first blocks of the first sequence and the ordered plurality of second blocks of the second sequence communicate with the network via the first blocks of the ordered plurality of first blocks and second blocks of the ordered plurality of second blocks configured to communicate with the at least one relay server.

11. A system comprising a first computer, wherein the first computer is configured to:

generate a first sequence comprising an ordered plurality of first blocks associated with at least one segment;

initialize the ordered plurality of first blocks according to the first sequence;

undertake data communication with a second computer according to the initialize the ordered plurality of first blocks, wherein each of the ordered plurality of first blocks-represents a configurable data communication function;

the second computer which is configured to:

generate a second sequence comprising an ordered plurality of second blocks associated with at least the first segment and the second segment;

initialize the ordered plurality of second blocks according to the second sequence; and undertake data communicate with the first computer according to the initialized the ordered plurality of second blocks, wherein each of at least one of the ordered plurality of second blocks is uniquely associated with a first block of the one or more ordered plurality of first blocks; and wherein one or more first blocks of the ordered plurality of first blocks and one or more second blocks of the ordered plurality of second blocks associated with communication functions configured to communicate with a connection server, wherein at least one first block of the ordered plurality of first blocks and at least one second block of the ordered plurality of second blocks associated with communication functions configured to communicate with the connection server is only used for initializing the data communication.

12. The system of claim 11, the first computer further configured to:

assign one or more of the ordered plurality of first blocks to a first segment and one or more other ones of the ordered plurality of first blocks to a second segment;

initialize the one or more ordered plurality of first blocks of the first segment and initialize the one or more other ones of the ordered plurality of first blocks of the second segment; and subsequently cause a data communication between a first block of the first segment and a first block of the second segment.

13. The system of claim 12, wherein at least one of the first segment and the second segment is associated with data communication with an application running on the first computer; and wherein at least one of the first segment and the second segment is associated with data communication with the second computer or another computer over a data network.

14. The system of claim 11, further comprising the second computer which is configured to:

generate a second sequence comprising an ordered plurality of second blocks associated with at least the first segment and the second segment;

initialize the ordered plurality of second blocks according to the second sequence; and undertake data communicate with the first computer according to the initialized the ordered plurality of second blocks, wherein each of at least one of the ordered plurality of second blocks is uniquely associated with a first block of the one or more ordered plurality of first blocks.

15. The system of claim 11, wherein:
the first computer is configured, when initializing the ordered plurality of first blocks, to traverse the ordered plurality of first blocks of a segment in a first direction followed by traversing in an opposite second direction; and
the second computer is configured, when the ordered plurality of second blocks, to traverse the ordered plurality of second blocks of a segment in a first direction followed by traversing in an opposite second direction,
wherein traversing comprises activating the communication functions associated with the ordered plurality of first blocks and the ordered plurality of second blocks according to activation rules,
wherein each one of the ordered plurality of first blocks and each one of the ordered plurality of second blocks is configurable as a top-down block type or a bottom-up block type, and an activation rule is such that only the communication functions associated with the ordered plurality of first blocks and the ordered plurality of second blocks of the top-down block type are activated when traversed in the first direction and such that only the communication functions associated with the ordered plurality of first blocks and the ordered plurality of second blocks of the bottom-up type are activated when traversed in the second direction.

16. The system of claim 11, wherein:
the first computer is configured, when the ordered plurality of first blocks, to traverse the ordered plurality of first blocks of a segment in a first direction only; and
the second computer is configured, when the ordered plurality of second blocks, to traverse the ordered plurality of second blocks of a segment in a first direction only,
wherein traversing comprises activating the communication functions associated with the ordered plurality of first blocks and the ordered plurality of second blocks according to activation rules.

17. The system of claim 11, wherein at least one of the ordered plurality of first blocks and/or at least one of the ordered plurality of second blocks is configured as an encapsulating block type, such that that the communication functions associated with the configured at least one of the ordered plurality of first blocks and the configured at least one of the ordered plurality of second blocks cause their respective computers to undertake the data communication after initialization; and
wherein at least one first block of the ordered plurality of first blocks and/or at least one second block of the ordered plurality of second blocks is configured as a non-encapsulating block type, such that the configurable communication functions associated with the configured at least one of the ordered plurality of first blocks and at least one of the ordered plurality of second blocks do not take part in the data communication after initialization.

18. The system of claim 11, wherein at least one first block of the ordered plurality of first blocks is an originating first block configured to interact with an application running on the first computer and/or wherein at least one second block of the ordered plurality of second blocks is an originating second block configured to interact with an application running on the second computer, wherein the data communication is between a first application running on the first computer and a second application running on the second computer.

19. The system of claim 11, further comprising one or more of the ordered plurality of first blocks and one or more of the ordered plurality of second blocks associated with communication functions configured to communicate with at least one relay server,
wherein the ordered plurality of first blocks of the first sequence and the ordered plurality of second blocks of the second sequence communicate with the network via the first blocks of the ordered plurality of first blocks and second blocks of the ordered plurality of second blocks configured to communicate with the at least one relay server.

* * * * *

UNITED STATES PATENT AND TRADEMARK OFFICE
CERTIFICATE OF CORRECTION

PATENT NO. : 12,052,334 B2
APPLICATION NO. : 17/773262
DATED : July 30, 2024
INVENTOR(S) : Todd Steven Hubers Van Assenraad Page 1 of 1

It is certified that error appears in the above-identified patent and that said Letters Patent is hereby corrected as shown below:

In the Claims

In Column 21, Claim 15, Line 10, between "when" and "the" insert --initializing--;

In Column 21, Claim 16, Line 32, between "when" and "the" insert --initializing--; and In Column 21, Claim 16, Line 35, between "when" and "the" insert --initializing--.

Signed and Sealed this
Twenty-fourth Day of September, 2024

Katherine Kelly Vidal
*Director of the United States Patent and Trademark Office*